(12) United States Patent
Arroyo Beltri et al.

(10) Patent No.: US 11,608,812 B2
(45) Date of Patent: Mar. 21, 2023

(54) METHOD FOR REDUCING VIBRATIONS IN ROTOR BLADES OF A WIND TURBINE

(71) Applicant: General Electric Renovables España, S.L., Barcelona (ES)

(72) Inventors: Pedro Arroyo Beltri, Barcelona (ES); Thomas Picard, Barcelona (ES); Marc Canal Vila, Barcelona (ES); Ricardo Lázaro Bosch, Barcelona (ES); Pedro Palomares Rentero, Barcelona (ES)

(73) Assignee: General Electric Renovables España, S. L., Barcelona (ES)

( * ) Notice: Subject to any disclaimer, the term of this patent is extended or adjusted under 35 U.S.C. 154(b) by 152 days.

(21) Appl. No.: 16/702,652

(22) Filed: Dec. 4, 2019

(65) Prior Publication Data
US 2020/0173418 A1 Jun. 4, 2020

(30) Foreign Application Priority Data
Dec. 4, 2018 (EP) .................................... 18382891

(51) Int. Cl.
*F03D 7/02* (2006.01)
*G05B 13/00* (2006.01)
*G01M 1/00* (2006.01)

(52) U.S. Cl.
CPC ............. *F03D 7/0296* (2013.01); *G01M 1/00* (2013.01); *G05B 13/00* (2013.01); *G05B 2219/2619* (2013.01)

(58) Field of Classification Search
CPC ........ F03D 7/0296; G01M 1/00; G05B 13/00; G05B 2219/2619

USPC ......................................................... 700/280
See application file for complete search history.

(56) References Cited

U.S. PATENT DOCUMENTS

| 10,215,156 | B2* | 2/2019 | Caffrey | ................... F03D 7/022 |
| 2010/0301604 | A1 | 12/2010 | Nielsen et al. | |
| 2010/0301605 | A1 | 12/2010 | Nielsen et al. | |
| 2011/0243706 | A1* | 10/2011 | Damgaard | .............. F03D 17/00 414/800 |

(Continued)

OTHER PUBLICATIONS

European Search Report Corresponding to EP18382891 dated May 31, 2019.

*Primary Examiner* — Rocio Del Mar Perez-Velez
*Assistant Examiner* — Christopher W Carter
(74) *Attorney, Agent, or Firm* — Dority & Manning, P.A.

(57) ABSTRACT

Methods (200) for reducing vibrations in one or more rotor blades (120) of a wind turbine (160), when the wind turbine is in standstill conditions are provided. The method comprises measuring (201) one or more deformation parameters indicative of deformation of one or more blades (120), determining (202), at a dedicated controller (190) for an auxiliary drive system (20, 107), a vibration of one or more of the blades (120) based on the deformation parameters, wherein the dedicated controller (190) for the auxiliary drive system is separate from the wind turbine controller (180), and generating (203), at the dedicated controller (190), an output signal to operate the auxiliary drive system to reduce the vibration. Also disclosed are wind turbines (160) which comprise a dedicated controller (190) configured to determine a vibration and generating an output signal to reduce the vibration, when the wind turbine is in standstill conditions.

15 Claims, 5 Drawing Sheets

(56) References Cited

U.S. PATENT DOCUMENTS

| | | | |
|---|---|---|---|
| 2011/0280725 A1* | 11/2011 | Taylor | F03D 7/043 |
| | | | 416/1 |
| 2012/0056425 A1 | 3/2012 | Cousineau | |
| 2012/0146331 A1* | 6/2012 | Egedal | F03D 7/0276 |
| | | | 290/44 |
| 2012/0217748 A1* | 8/2012 | Gjerlov | F03D 7/0204 |
| | | | 290/44 |
| 2014/0145439 A1* | 5/2014 | Burra | F03D 7/0204 |
| | | | 290/44 |
| 2015/0322924 A1* | 11/2015 | Menasanch De Tobaruela | |
| | | | F03D 1/06 |
| | | | 73/660 |
| 2018/0266391 A1 | 9/2018 | Danielsen | |
| 2019/0154001 A1* | 5/2019 | Ostergaard | F03D 7/042 |

* cited by examiner

METHOD FOR REDUCING VIBRATIONS IN ROTOR BLADES OF A WIND TURBINE

The present disclosure relates to methods for reducing vibrations in rotor blades of a wind turbine and wind turbines configured for implementing such methods for reducing vibrations.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven") or through the use of a gearbox. This way, the generator produces electricity which can be supplied to the electrical grid.

There is a trend to make wind turbine blades increasingly longer to capture more wind and convert the energy of the wind into electricity. That makes blades more flexible and more prone to aero-elastic instabilities, e.g. vibrations of the blades. Vibrating blades can also excite rotor mode shapes creating risks of major potential damages in the entire wind turbine.

When the wind turbine is in operation, a wind turbine controller may operate directly or indirectly any auxiliary drive systems such as a pitch system or a yaw system to reduce loads on the blades. This way, vibrations of the blades may be counteracted. However, the problem of aero-elastic instabilities can be serious as well in circumstances when the wind turbine is in stand-still conditions, either idling or locked. Such oscillations include in particular edgewise oscillations.

At least two edgewise oscillations or vibrations may happen during stand-still conditions. The first ones are so-called vortex induced vibrations when an angle of attack is around 90 degrees and vortices shedding may happen at frequencies close to blade eigen frequencies. The second ones are stall induced vibrations when the angle of attack is close to stall angles (e.g. 15 degrees-20 degrees) and the flow interaction may lead to blade vibrations. The angle of attack may be understood as a geometrical angle between a flow direction of the wind and the chord of a rotor blade.

The vortex and stall induced vibrations are phenomena that are hard to simulate with state of the art tools, so they are usually disregarded during the design phase. That can lead to blade failure at the blade root due to blade laminate, blade bolts, etc, or accelerate the fatigue damage. When all the blades are vibrating in phase there is a potential risk of major failure. A worse scenario is caused by rotor blades vibrating in resonance. The resonance, even if it lasts only a short time and does not cause a major failure, it can create loads that may affect the fatigue life of structural components. The effect of these loads is usually impossible to calculate as there is no information about the loads and the time frame.

When the rotor is locked, for instance due to installation, commissioning or maintenance tasks, the rotor cannot rotate to alleviate vibration. And specifically when the wind turbine is not operative yet e.g. the wind turbine is installed and not commissioned yet or also inactive if a loss of communication or any other failure occurs that does not allow to communicate with the controllers, wind turbine yaw angle and blade pitch angle are fixed and rotor angle or azimuth is also fixed. None of these three movements yaw, pitch and rotor can be changed if controls such as software, firmware, etc. are not yet operative. The risk of excessive vibrations or even resonance may be higher because none of those movements are available to alleviate the loads and/or reduce the vibrations.

A wind turbine is not usually operative after installation and before completing the commissioning thereof. The wind turbine may also be in standstill during a repair of the wind turbine that requires the rotor being locked or at least standing still.

The risk of major failure of the non-operative wind turbine might be reduced with proper nacelle alignment to predominant wind direction and wind speeds. However, manual intervention is needed to activate the yaw mechanism to rotate the nacelle with respect to the tower if wind direction or wind speed changes, since the wind turbine is not commissioned yet.

Moreover the wind turbines may be in standstill with the rotor locked and without any control activated in the wind turbine during long periods of time. Some wind turbines may be installed but not commissioned yet until several weeks or months later because of installation projects constraints in large wind turbine parks with several wind turbines to be installed. Offshore projects are a clear example thereof.

Commissioning personnel may be prevented from going to the wind turbines for commissioning because of weather conditions e.g. wind speeds or large waves. In these situations in which the rotor is parked for a long time without active controls, blade instabilities may be a major risk that may cause critical damage in the blade or a blade bolted connection. Also rotor mode shapes may also be excited leading to a major failure. And the situation is especially important for large wind turbine blades, which are typically found in offshore applications.

A current solution to the cited problems includes the use of aerodynamic devices attached to the blades to reduce vortices and stall. However, this solution may reduce blade performance during operation.

Another current solution includes setting the pitch angle of the rotor blades to substantially 90 degrees (a "weathervane" position) when the rotor is prevented from rotating by means of a locking pin. Such a particular pitch angle may reduce loads on the blades, at least with some wind conditions. However, the locking pin may suffer from higher loads when the pitch angle is set to said amount. The locking pin must be reinforced to withstand higher loads, e.g. an oversized locking pin. Moreover, even in the weathervane position, not all vibrations may actually be avoided if e.g. the wind direction changes over time.

The present disclosure provides examples of methods and wind turbines that at least partially resolve some of the aforementioned disadvantages.

SUMMARY

In one aspect, a method for reducing vibrations in one or more rotor blades of a wind turbine, when the wind turbine is in standstill conditions is provided. The method comprises measuring one or more deformation parameters indicative of deformation of one or more blades; and determining, at a dedicated controller for an auxiliary drive system, a vibration of one or more of the blades based on the deformation parameters, wherein the dedicated controller for the auxiliary drive system is separate from the wind turbine controller. The method furthermore comprises generating, at the dedicated controller, an output signal to operate the auxiliary drive system to reduce the vibration.

In this aspect, the method may reduce vibrations in blades when the wind turbine is in standstill conditions. The method may be performed without communication between the wind turbine and remote controllers, i.e. even during commissioning phase. The risk of high loads or failure between installation and commissioning can be reduced.

Furthermore, the method may reduce the risk of resonances when the wind turbine is in standstill conditions, and also the cost of manual interventions on site.

In another aspect, a wind turbine having a nacelle, a tower and rotor blades is provided. The wind turbine comprises a wind turbine controller, one or more sensors for measuring a deformation of one or more of the blades, and an auxiliary drive system for driving one or more wind turbine components. The wind turbine furthermore comprises a dedicated controller for the auxiliary drive system. The dedicated controller is configured to operate independently from the wind turbine controller. The dedicated controller is further configured to determine a vibration of one or more blades based on the measured deformation and to generate an output signal to operate the auxiliary drive system to reduce the vibration, when the wind turbine is in standstill conditions.

In yet another aspect, a method for reducing vibrations in one or more rotor blades of a wind turbine, when the wind turbine is locked during a commissioning phase is provided. The wind turbine has a wind turbine controller and a dedicated pitch controller for a pitch drive system of the wind turbine. The method comprises measuring a strain of one or more of the blades in an edgewise direction relative to a chord of the blade. It also comprises determining, at the dedicated pitch controller, a vibration condition of one or more blades based on the measured strain. The method further comprises generating, at the dedicated pitch controller, an output signal to operate the pitch system to reduce oscillations of one or more of the rotor blades.

Advantages derived from this aspect may be similar to those mentioned regarding the method of the first aspect.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Figure 1:
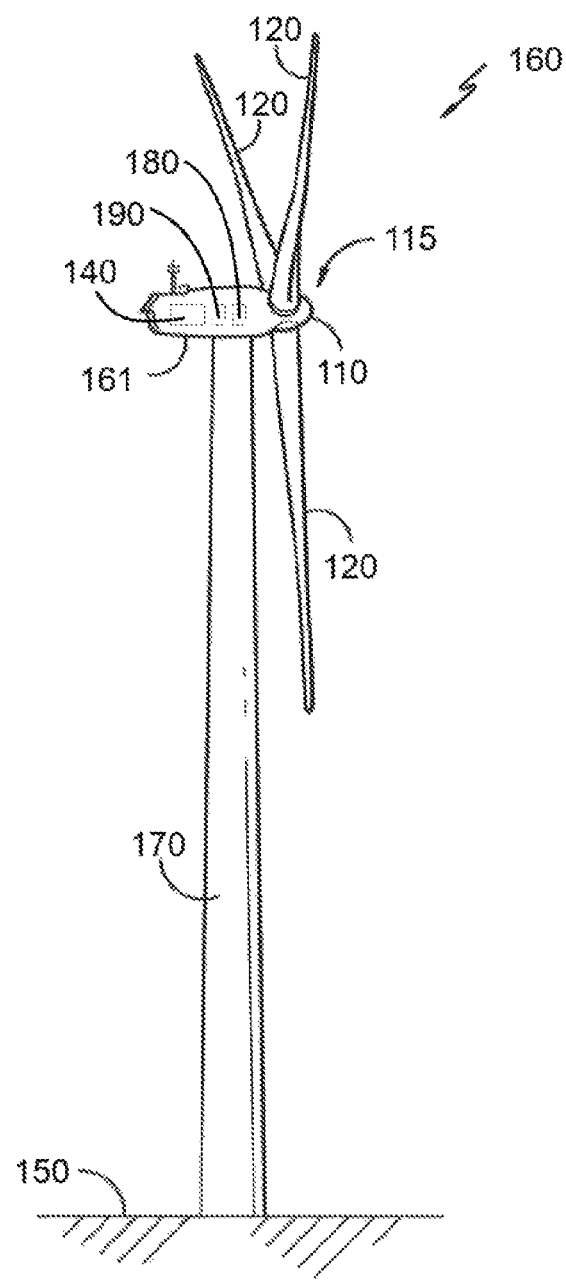
FIG. 1 illustrates a perspective view of a wind turbine according to one example.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated example, the rotor 115 includes three rotor blades 120. However, in an alternative embodiment, the rotor 115 may include more or less than three rotor blades 120. Each rotor blade 120 may be spaced from the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 or forming part of the nacelle to permit electrical energy to be produced.

The wind turbine 160 may also include a wind turbine controller 180 centrally located within the nacelle 161. However, in other examples, the wind turbine controller 180 may be located within any other component of the wind turbine 160 or at a location outside the wind turbine. Further, the controller 180 may be communicatively coupled to any number of components of the wind turbine 160 in order to control the operation of such components.

Furthermore, the wind turbine 160 may also include a dedicated controller 190 for an auxiliary drive system. The auxiliary drive system may comprise a pitch system 107 for adjusting a blade pitch. Alternatively, the auxiliary drive system may comprise a yaw system 20 for rotating the nacelle 161 with the respect to the tower around a rotational axis. Details of both examples of auxiliary drive systems will be provided in the following. The dedicated controller 190 may be centrally located within the nacelle 161. However, in other examples, the dedicated controller 190 may be located within any other component of the wind turbine 160 or at a location outside the wind turbine. The dedicated controller 190 may control a single auxiliary drive system or alternatively at least two of them.

The dedicated controller 190 may be configured to operate autonomously, i.e. independently from the wind turbine controller 180, at least in some operating conditions. This way, the dedicated controller 190 may be able, at least, to perform tasks such as receiving and emitting signals and processing data when the wind turbine controller 180 is in standstill conditions. In order to operate autonomously, the dedicated controller 190 may have suitable algorithms to operate before commissioning stage is completed. In other operating conditions, e.g. normal standard operation, the dedicated controller may be in communication and receive control signals from the wind turbine controller 180.

The term "dedicated controller" as used throughout the present description is preferably meant to indicate any controller that is entrusted with the control of a single component or single system. E.g. the dedicated pitch controller only controls the pitch of one or more blades and is not configured to control e.g. a yaw system. The dedicated controller may include one or more processor(s) and associated memory device(s) configured to perform a variety of computer-implemented functions (e.g., performing the methods, steps, calculations and the like and storing relevant data as disclosed herein).

The standstill conditions may refer to those conditions when the wind turbine is not commissioned yet i.e. control systems are not activated, communications are not available and the rotor is locked. Standstill conditions as used throughout the present disclosure may also include a wind turbine being parked, but not locked.

The wind turbine 160 of FIG. 1 may be placed in an offshore or onshore location.

The wind turbine controller (or "central control system") 180 may include one or more processor(s) and associated memory device(s) configured to perform a variety of computer-implemented functions (e.g., performing the methods, steps, calculations and the like and storing relevant data as disclosed herein). The wind turbine controller may perform various different functions, such as receiving, transmitting and/or executing wind turbine control signals and controlling the overall operation of the wind turbine. The wind turbine controller may be programmed to control the overall operation based on information received from sensors indicating e.g. loads, wind speed, wind direction, turbulence failure of a component and other.

The wind turbine controller may also include a communications module to facilitate communications between the controller and the components of the wind turbine and their individual control systems. I.e. the wind turbine controller may in operation communicate with a pitch control system, a yaw control system, a converter control system and other controls and components.

Further, the communications module may include a sensor interface (e.g., one or more analog-to-digital converters) to permit signals transmitted from one or more sensors to be converted into signals that can be understood and processed by the processors. It should be appreciated that the sensors may be communicatively coupled to the communications module using any suitable means as for example a wired connection or a wireless connection. As such, the processor may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor is also configured to compute advanced control algorithms and communicate to a variety of Ethernet or serial-based protocols (Modbus, OPC, CAN, etc.). Additionally, the memory device(s) may comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may be configured to store suitable computer-readable instructions that, when implemented by the processor(s), configure the controller to perform the various functions as described herein.

Figure 2:
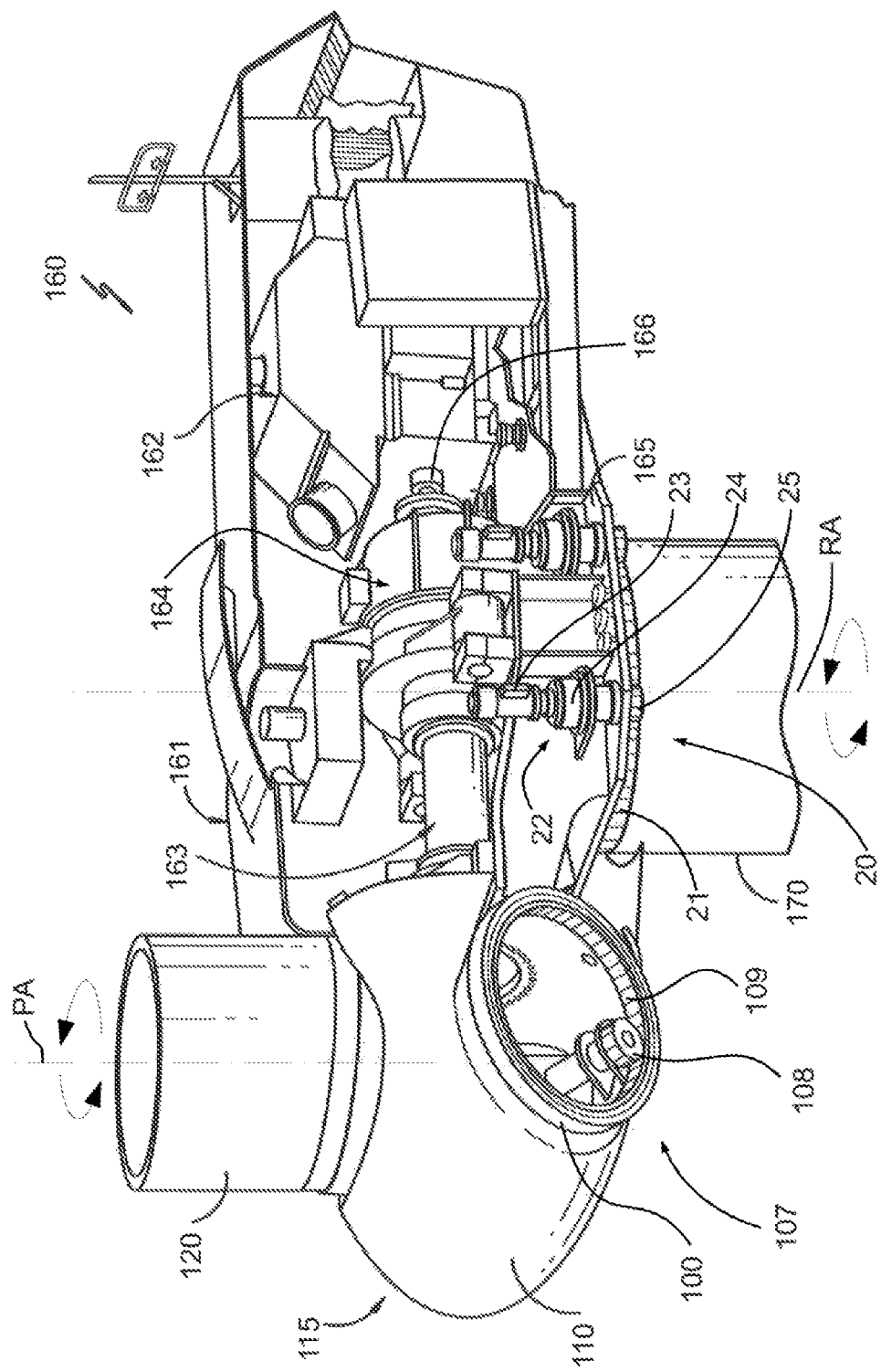
FIG. 2 illustrates a simplified, internal view of a nacelle of a wind turbine according to one example.

FIG. 2 illustrates a simplified, internal view of one example of the nacelle 161 of the wind turbine 160 of the FIG. 1. As shown, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

The nacelle 161 is rotatably coupled to the tower 170 through the yaw system 20 in such a way that the nacelle 161 is able to rotate about a rotating axis or "yaw axis" RA. The yaw system 20 comprises a yaw bearing having two bearing components configured to rotate with respect to the other. The tower 170 is coupled to one of the bearing components and the bedplate or support frame 165 of the nacelle 161 is coupled to the other bearing component. The yaw system 20 comprises an annular gear 21 and a plurality of yaw drives 22 with a motor 23, a gearbox 24 and a pinion 25 for meshing with the annular gear 21 for rotating one of the bearing components with respect to the other.

Blades 120 are coupled to the hub 110 with a pitch bearing 100 in between the blade 120 and the hub 110. The pitch bearing 100 comprises an inner ring and an outer ring (shown in FIG. 2). A wind turbine blade may be attached either at the inner bearing ring or at the outer bearing ring, whereas the hub is connected at the other. A blade 120 may perform a relative rotational movement with respect to the hub 110 when the pitch system 107 is actuated. The rotational movement is performed around a pitch axis PA and thus can be measured in degrees as will be further detailed in conjunction with FIG. 3. The inner bearing ring may therefore perform a rotational movement with respect to the outer bearing ring. The pitch system 107 of FIG. 2 comprises a pinion 108 that meshes with an annular gear 109 provided on the inner bearing ring to set the wind turbine blade into rotation.

Even though the pitch axis is shown for only a single blade, it should be clear that each of the blades has such a pitch axis. And a single pitch system or a plurality of individual pitch systems may be used to rotate the blade around their longitudinal axes.

Regarding the example of FIG. 1, the wind turbine 160 further includes a dedicated power source 140 which may comprise a battery or an ultracapacitor (not illustrated) which may store a predefined amount of energy to feed the dedicated controller 190 and the auxiliary drive system 20, 107 during a predefined period of time. That is to say, the dedicated power source 140 is configured to provide power in standstill conditions. In alternative examples, the dedicated power source 140 may comprise a fuel generator such as a diesel generator.

Figure 3:
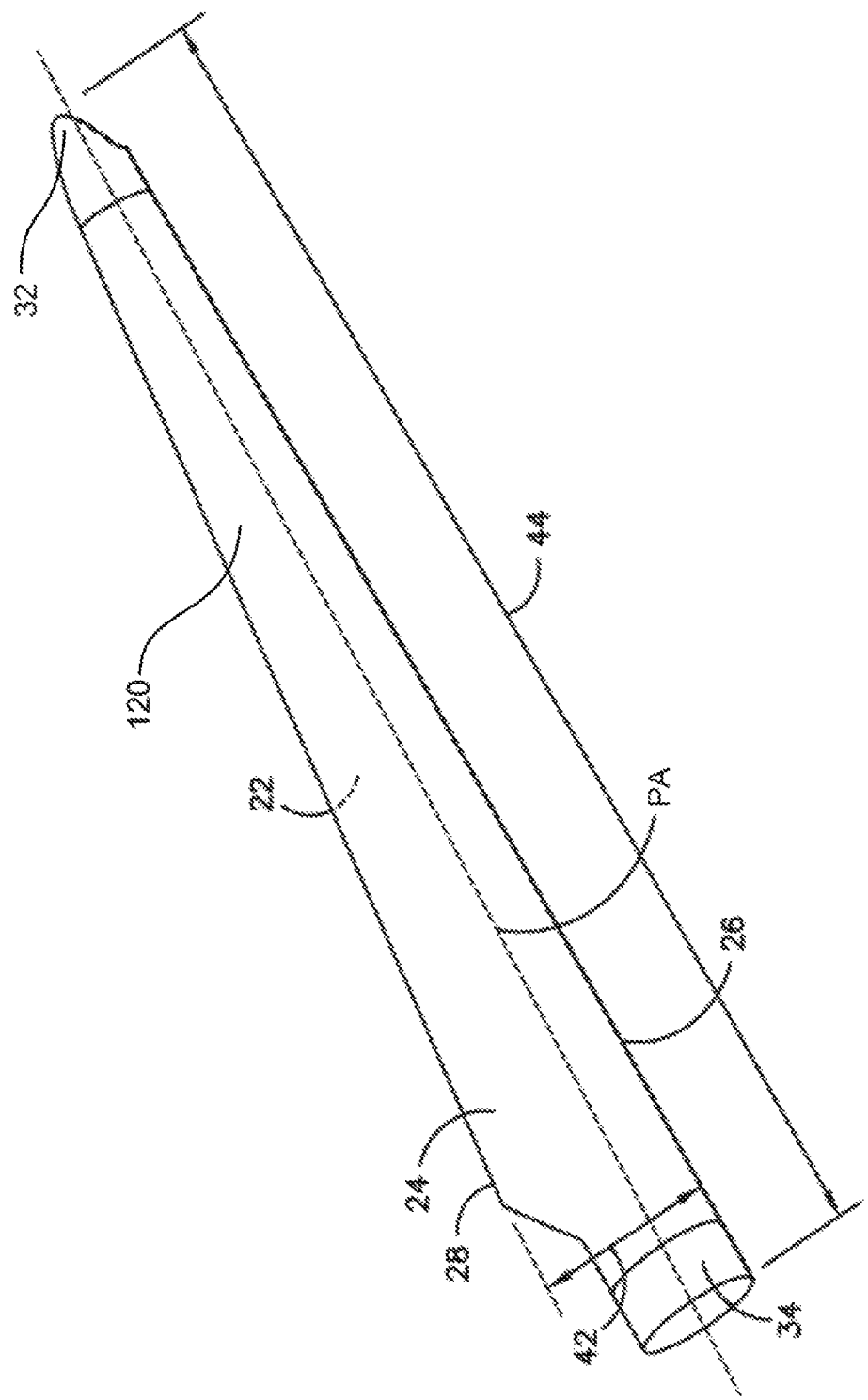
FIG. 3 illustrates a perspective view of a rotor blade of the wind turbine of FIG. 1 according to one example.

Referring now to FIG. 3, a rotor blade 120 for the wind turbine 160 is illustrated. Further, as shown, the rotor blade 120 has a pressure side 22 and a suction side 24 extending between a leading edge 26 and a trailing edge 28 that extend from a blade tip 32 to a blade root 34. The rotor blade 120 further defines the pitch axis PA relative to the rotor hub 115 (FIGS. 1 and 2) that typically extends perpendicularly to the rotor hub 115 and blade root 34 through the center of the blade root 34. A pitch angle or blade pitch of the rotor blade 120, i.e., an angle that determines a perspective of the rotor blade 120 with respect to the air flow past the wind turbine 160, may be defined by rotation of the rotor blade 120 about the pitch axis PA. In addition, the rotor blade 120 further defines a chord 42 and a span 44. More specifically, as shown in FIG. 3, the chord 42 may vary throughout the span 44 of the rotor blade 120. Thus, a local chord may be defined for the rotor blade 16 at any point on the blade 16 along the span 44.

In standstill conditions, in one specific example, blades 120 of the wind turbine 160 may have a pitch angle set to about 0 degrees. The rotor 115 may be blocked, so it is prevented from rotating. The rotor may be blocked through a locking pin (not illustrated). As the pitch angle is set to said amount, loads on the locking pin may be lower than loads when the pitch angle is set to about 90 degrees ("weathervane"). Therefore, setting the pitch angle to substantially 0 degrees may make the locking pin less expensive and thus the wind turbine may be optimized.

Furthermore, in the following it may be assumed that the wind turbine 160 is not commissioned yet, i.e. software or firmware to control the wind turbine 160, for instance through the wind turbine controller 180, is not operative yet. Proper communications between the wind turbine 160 and remote controls are not available yet. As there are not remote controls or local controls activated, the auxiliary drive systems cannot be acted upon remotely.

Figure 4:
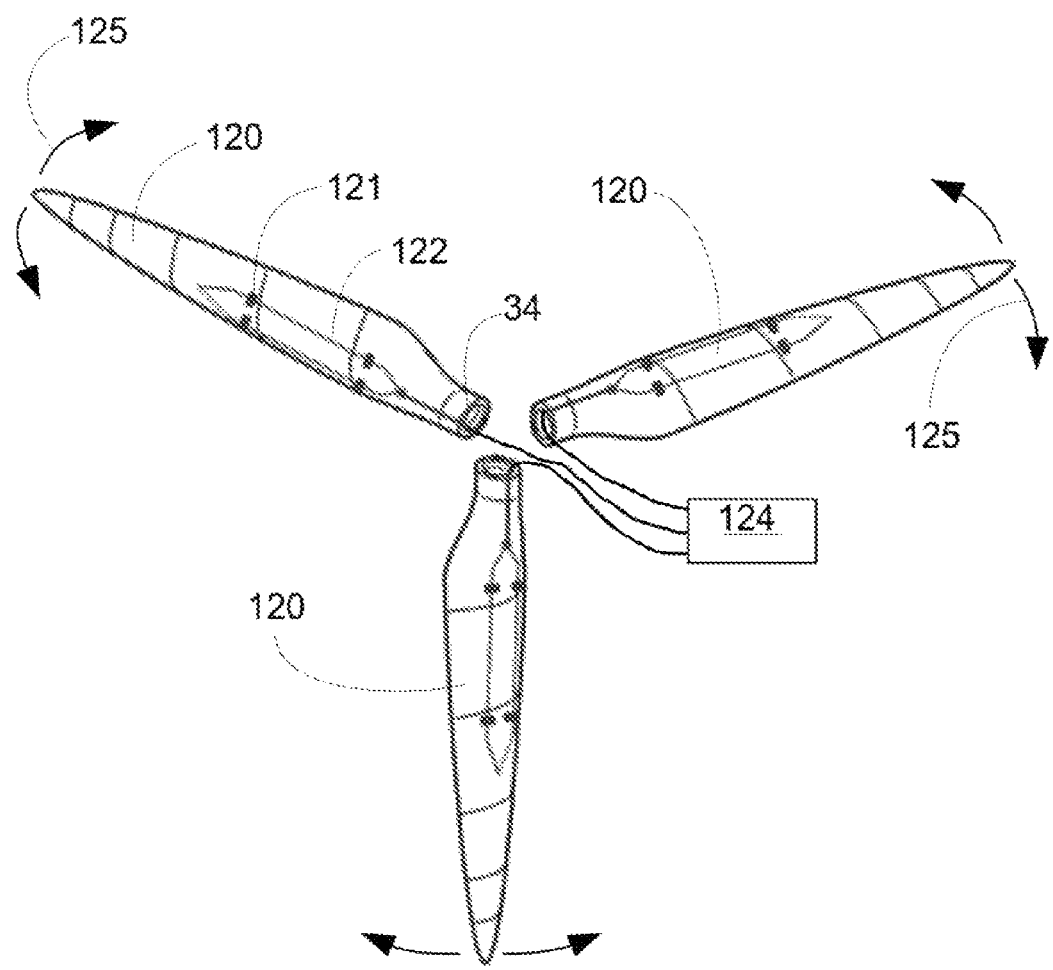
FIG. 4 illustrates blades of the wind turbine of FIG. 1 with sensors for measuring a deformation of blade according to one example.

According to one aspect, a wind turbine 160 having a nacelle 161, a tower 170 and rotor blades 120 as per FIG. 1 is disclosed. FIG. 4 illustrates blades 120 of the wind turbine of FIG. 1 according to one example. The wind turbine 160 in this example comprises sensors 121 for measuring a deformation of one or more of the blades 120. Such sensors for measuring a deformation may be strain sensors and may be provided at one or more rotor blades 120 for measuring a deformation/strain parameter of the blade. The wind turbine 161 also comprises an auxiliary drive system 20, 107 for driving wind turbine components so as to adjust loads on the blade. The wind turbine 161 further comprises a dedicated controller 190 for the auxiliary drive system and the dedicated controller 190 is configured to operate independently from a wind turbine controller 180. The dedicated controller 190 is further configured to determine a vibration of one or more blades 120 and generating an output signal to operate the auxiliary drive system to reduce or counteract the vibration, when the wind turbine 160 is in standstill conditions.

In FIG. 4, the rest of the components of the wind turbine 160 have not been illustrated for the sake of clarity. In the example of FIG. 4, the strain sensors 121 are fiber optic strain gauges fixed at a structure of the blades 120 so as to measure strains at any portions of the blade, e.g. a blade root 34. Thus, loads on the blade may be calculated on the basis of the measured strains. The strain sensors 121 are connected with each other through an optical path 122, e.g. optical fibre. The optical path 122 also allows the strain sensors 121 to be in communication with a sensor interrogation unit 124 or reading unit placed in the hub 115 or the nacelle 161. The sensor interrogation unit 124 is configured to feed the optical path 122 with emitted light pulses (not illustrated) and to receive light pulses from the strain sensors 121. The interrogation unit 124 is further configured to compare the emitted light pulses with received light pulses so as to determine deflections in blades 120.

The number and location of strain sensors 121 in blades 120 may vary depending on particular requirements.

The dedicated controller 190 may include or may be integral with the sensor interrogation unit 124. Alternatively, the sensor interrogation unit 124 may be separated from the dedicated controller 190 and in data communication with each other. When the unit 124 and the controller 190 are separated, the dedicated power source 140 also supplies power to the unit 124.

In some other examples, some strain sensors 121 may be provided with temperature sensors. Temperature data from temperature sensors of the blades 120 may be taken into account by the unit 124 or even by the dedicated controller 190 because the temperature may affect operation and characteristics of strain sensors 121.

Alternatively to the example of optic strain gauges, other sensors 121 capable of indicating a deformation of one or more of the blades may be used. Examples include accelerometers or displacement sensors in data communication with the dedicated controller 190.

In one example of the wind turbine 160, the auxiliary drive system is a pitch system 107 for adjusting a pitch angle of a single blade, e.g. the pitch system 107 of FIG. 2. Alternatively, the pitch system may adjust the pitch angle of multiple blades at the same time.

Alternatively, the auxiliary drive system may comprise a yaw system 20 for rotating the nacelle 161 with the respect to the tower 170 around a rotational axis RA, see for instance FIG. 2.

Figure 5:
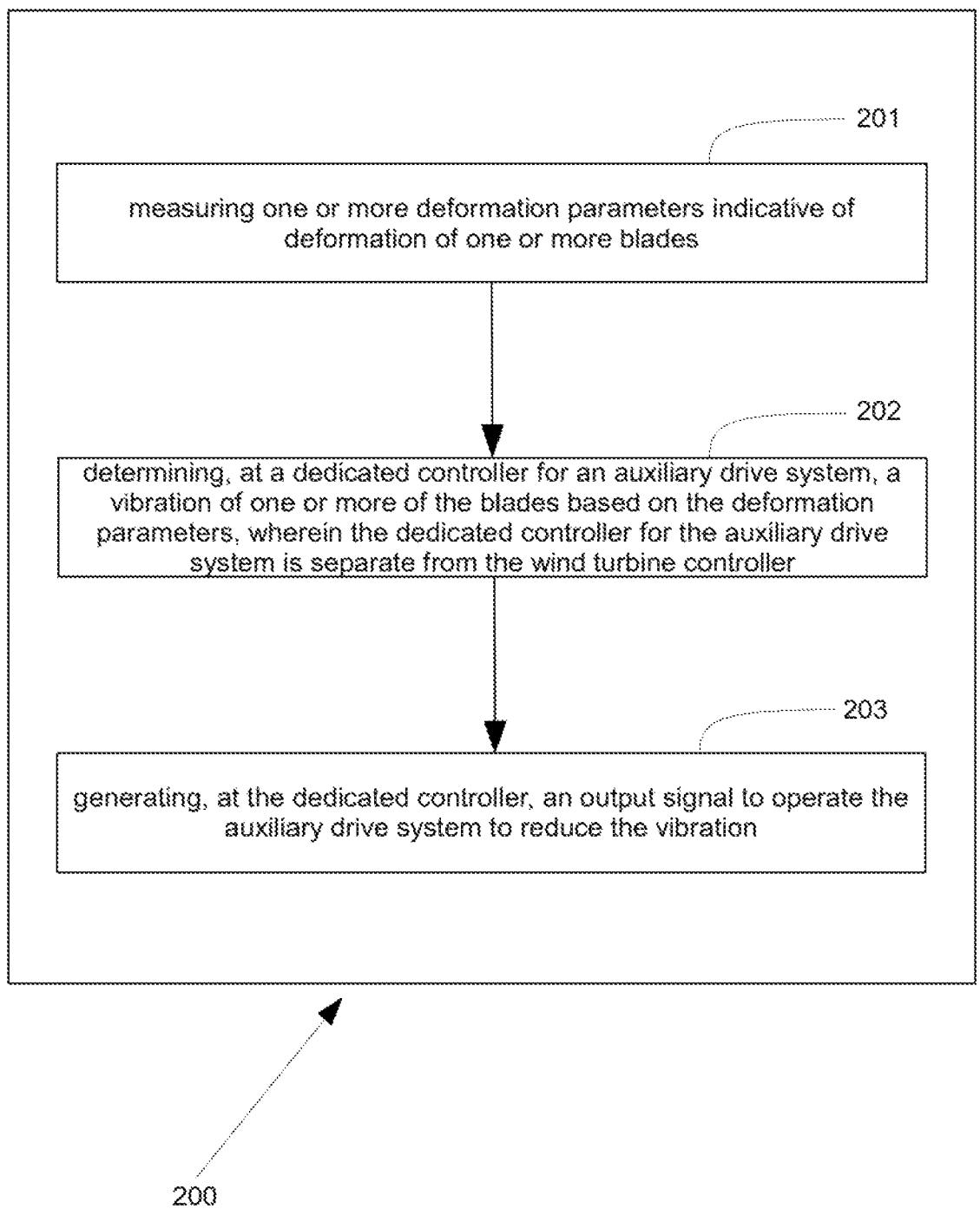
FIG. 5 shows a flowchart of a method for reducing vibrations in rotor blades of a wind turbine according to one example.

FIG. 5 shows a flowchart of a method for reducing vibrations in rotor blades of a wind turbine 200 according to one example. The wind turbine 160 may be that one illustrated in FIG. 1 and thus it includes the wind turbine controller 180 and the dedicated controller 190 for the auxiliary drive system of the wind turbine.

According to an aspect, a method 200 for reducing vibrations in one or more rotor blades of a wind turbine is disclosed. The method 200 is implemented when the wind turbine is in standstill conditions. The method 200 comprises measuring one or more deformation parameters of one or more blades 201 and determining, at the dedicated controller 190, a vibration of one or more blades 202 based on the deformation parameters. The method 200 also comprises generating, at the dedicated controller 190, an output signal to operate the auxiliary drive system to counteract the vibration 203.

According to one example, deformation parameters indicative of deformation of one or more blades may be strain parameters.

In some examples, a vibration of one or more blades may be determined when the strain or deformation parameter satisfies a strain or deformation threshold. By way of example, the dedicated controller 190 may be configured to determine the vibration when the strain parameter satisfies the strain threshold.

Strains in the edgewise direction of blade 120 may cause a counter deflection of blade 120 in opposite direction owing to flexible properties of blade 120. That may produce an oscillating displacement of the blade 120 when the wind turbine 120 is in standstill conditions as above described. Therefore, the strain threshold of the example above may be related to a predefined amplitude threshold of the oscillation. When the strain parameter satisfies a strain threshold, it may mean that the amplitude of the oscillation of one or more blades 120 may be excessive. Then, a vibration condition may be determined. In FIG. 4, arrows 125 designate exemplary directions followed by the oscillating displacement of blades 120.

According to some examples, determining a vibration of one or more blades may comprise processing an input signal which includes the strain parameter. The input signal may comprise a waveform of the strain parameter over time. In an example of the method 200, the input signal may be received from the sensor interrogation unit 124 or from the strain sensors 121.

An oscillating displacement or movement of a blade 120 over a predefined period of time may involve a frequency. Therefore, in order to process the input signal, some examples of the method 200 may comprise filtering the input signal and analyzing frequencies of the input signal which satisfy a frequency threshold. This way, only frequencies in a predefined critical range may be analyzed. Alternatively, the input signal may be processed analyzing all the spectrum of frequencies of the input signal. Through both alternatives, the auxiliary drive system may counteract the vibration condition when actually risky vibrations happen. Thus, the method 200 may discriminate harmful vibrations from usual and acceptable movements.

In one example, the method 200 may further comprise determining whether one or more blades is in a resonance condition. The dedicated controller 190 may determine said resonance condition of one or more blades. The resonance condition may be determined when the frequency of the input signal satisfy a resonance threshold. The resonance threshold may involve frequencies higher than the frequency threshold. Alternatively, the resonance condition may be determined when the frequency of the input signal, and thus the energy of the vibration, increases for a defined time period. The method 200 according to both examples allows to operate the auxiliary drive system so as to break an air flow responsible of vortex and stalls and reducing or eliminating resonance.

In some examples, when the method 200 is carried out, the blades 120 are arranged with a pitch angle of substantially 0 degrees in standstill conditions. Said pitch angle involves a simpler locking pin and so an optimized configuration of the wind turbine.

In some further examples, the wind turbine 160 may be in standstill conditions during commissioning phase. The example of the pitch angle of substantially 0 degrees may correspond to a default parking position of the blades 120 when the wind turbine 160 is in standstill conditions.

In some examples, the method 200 may further comprise supplying or feeding power the dedicated controller 190 and the auxiliary drive systems 20, 107, with power from a dedicated power source 140 for the auxiliary drive system.

According to a further example of the method 200, the dedicated power source 140 may comprise a battery or an ultracapacitor which may store a predefined amount of energy to feed the dedicated controller and the auxiliary drive systems during a predefined period of time. Such a period of time may be several weeks or months. In alternative examples, the dedicated power source 140 may comprise a fuel generator such as a diesel generator.

In some examples, the pitch system may be identified as a category I component, for which continuous power supply is guaranteed even during installation, and even when the grid is down.

In some examples of the method 200, determining a vibration of one or more blades, may comprise determining whether the one or more blades is oscillating in an edgewise direction relative to a chord of the blade. An edgewise oscillation may occur along the chord of between the trailing edge 28 and the leading edge 26 of the rotor blade 120.

In one example of the method 200, generating an output signal to operate the auxiliary drive system to counteract the vibration, may comprise taking into account a wind direction relative to the one or more blades.

In some further examples, the method 200 may further comprise determining whether all the blades are vibrating in phase. If all the blades are vibrating in phase, the consequences on the integrity of the wind turbine 160 can be worst, e.g. breakage of a locking pin of the rotor or a major failure of the turbine. The dedicated controller 190 may compare the input signal of each of the blades with each other in order to identify a vibration in phase. The output signal may be generated based on the identification of a vibration in phase, e.g. the output signal may be generated so as to operate the auxiliary drive system in a greater amount. The risk of a vibration in phase may be higher when the pitch angle of rotor blades 120 is set to substantially 0 degrees than a pitch angle of substantially 90 degrees.

In one example, the method 200 may further comprise generating, at the dedicated controller, an output signal to operate the auxiliary drive system when the vibration condition is eliminated, so as to return the auxiliary drive system back to a default standstill position. The method 200 may be implemented in a closed loop since the wind turbine may keep reading strain parameter to confirm if the vibration condition is still satisfied or not.

In one example of the method 200, the auxiliary drive system may comprise a pitch system 107 for adjusting a blade pitch of one or more of the blades according to any of the herein described examples.

According to some examples, the pitch angle may be individually adjusted for a blade 121 which is vibrating, i.e. when a vibration has been determined by the dedicated controller 190. When the wind turbine 160 is in standstill conditions, a pitch angle in an individual blade 120 may be changed independent from the pitch angle of the other blades and regardless of its azimuth position.

In a further example of the method 200, the output signal may include a command to adjust the blade pitch to an extent where the vibration condition may be counteracted. The blade pitch may be adjusted in a certain degree enough to counteract the vibration condition so as to, at least, reduce. Alternatively, the blade pitch may be adjusted to eliminate the vibration condition. The blade pitch may be adjusted in one single blade or in a combination thereof.

In some examples of the method 200, a blade pitch angle may be adjusted in a range of 10-90 degrees to counteract the vibration condition. This range of adjustment may go beyond a typical pitch range when the wind turbine 160 is operating. Such range may allow modifying a wind flux surrounding the blade in order to effectively counteract a vibration condition. Alternatively, the blade pitch angle may be adjusted in a range of 15-75 degrees.

In a further example of the method 200, the auxiliary drive system may comprise a yaw system 20 for rotating a nacelle 161 with the respect to a tower 170 of the wind turbine around a rotational axis. This yaw system 20 will be according to any of the herein described examples.

In a further example of the method 200, the output signal may include a command to adjust the yaw of the wind turbine to an extent where the vibration condition is substantially eliminated. The yaw system may be adjusted in a similar way to the pitch system. In some examples, the yaw system may be adjusted as an alternative to the pitch system or even in conjunction with.

In some examples of the method 200, a yaw angle may be adjusted in a range of 15-90 degrees, specifically 15-30 degrees. Such a range may allow modifying a wind flux surrounding the blade in order to reduce or counteract a vibration condition.

Data based on the input and output signals may be recorded in a storage device (not illustrated) so as to feed computing simulation models in a later stage.

According to a yet another aspect, a method for reducing vibrations in one or more rotor blades of a wind turbine, when the wind turbine is locked during commissioning phase, is disclosed. The wind turbine has a wind turbine controller and a dedicated pitch controller for a pitch drive system of the wind turbine as above described in conjunction with FIG. 1. The method comprises measuring a strain of the one or more blades in an edgewise direction relative to a chord of the blade. The method further comprises determining, at the dedicated pitch controller, a vibration condition of one or more blades based on the measured strain. It also comprises generating, at the dedicated pitch controller, an output signal to operate the pitch driving system to counteract or reduce oscillations of one or more blades, if the vibration condition is determined.

In some examples, the method may further comprise feeding the dedicated pitch controller 190 and the pitch drive system 107 with power from the dedicated power source 140 for the pitch drive system.

In further examples of the method, the output signal may include a command to adjust the blade pitch to an extent where the vibration condition may be reduced or counteracted. The blade pitch may be adjusted in one single blade or in a plurality of blades as above mentioned.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for reducing vibrations in one or more rotor blades of a wind turbine when the wind turbine is in standstill conditions during a commissioning phase of the wind turbine, the method comprising performing the following operations during the commissioning phase when a wind turbine controller of the wind turbine is non-operable:
   using sensors mounted on the blades, measuring one or more deformation parameters indicative of oscillations induced in the blades and generating an input signal;
   determining, at a dedicated controller for an auxiliary drive system, a vibration of one or more of the blades by analyzing the input signal for vibration frequencies from the blade oscillations, wherein the dedicated controller for the auxiliary drive system is separate from and operating independently from the non-operable wind turbine controller;
   generating, at the dedicated controller, an output signal to operate the auxiliary drive system to reduce the vibration;
   wherein the auxiliary drive system is one of a pitch system for adjusting a pitch angle of the rotor blades or a yaw system for rotating a nacelle around a rotational axis with the respect to a tower of the wind turbine;
   with the dedicated controller, analyzing the input signal for the vibration frequencies of the blades that fall within a critical range;
   wherein the output signal is generated to operate the auxiliary drive system only when the vibration frequencies fall within the critical range; and
   upon subsequent operational conditions of the wind turbine after the commissioning phase with the wind turbine controller being operational, placing the dedicated controller in communication with the wind turbine controller and generating control signals for the dedicated controller via the wind turbine controller.

2. The method according to claim 1, wherein the blades are arranged with a pitch angle of substantially 0 degrees in the standstill conditions.

3. The method according to claim 1, further comprising:
   supplying the dedicated controller and the auxiliary drive system with power from a dedicated power source for the auxiliary drive system.

4. The method according to claim 3, wherein the dedicated power source comprises a battery or an ultracapacitor which stores a predefined amount of energy to supply the dedicated controller and the auxiliary drive system during a predefined period of time.

5. The method according to claim 1, wherein the determining the vibration of the one or more blades, comprises:
   determining whether the one or more blades is oscillating in an edgewise direction relative to a chord of blade.

6. The method according to claim 1 further comprising:
   generating, at the dedicated controller, an output signal to operate the auxiliary drive system when the vibration is eliminated, so as to return the auxiliary drive system back to a default standstill position.

7. The method according to claim 1, wherein the auxiliary drive system is the pitch system and the output signal includes a command to adjust the blade pitch to an extent where the vibration is reduced.

8. The method according to claim 7, wherein the blade pitch angle is adjusted in a range of 10-90 degrees to reduce the vibration.

9. The method according to claim 1, wherein the auxiliary drive system is the yaw system and the output signal includes a command to adjust the yaw of the wind turbine to an extent where the vibration is reduced.

10. The method according to claim 9, wherein the yaw angle is adjusted in a range of 15-90 degrees.

11. The method according to claim 1, comprising:
    determining from the vibration frequencies whether a resonance condition exists for one or more of the rotor blades.

12. A wind tur line, comprising:
    a nacelle;
    a tower;
    rotor blades;
    a wind turbine controller;
    one or more sensors mounted on the rotor blades for measuring oscillations induced in one or more of the rotor blades;
    an auxiliary drive system for driving one or more components of the wind turbine, the auxiliary drive system comprising one of a pitch system for adjusting a pitch angle of the rotor blades or a yaw system for rotating the nacelle around a rotational axis with the respect to the tower;
    the wind turbine controller configured to control the auxiliary drive system during operational conditions of the wind turbine;
    a dedicated controller configured to control the auxiliary drive system independently from the wind turbine controller during standstill conditions when the wind turbine is in a non-operational commissioning phase and the wind turbine controller is non-operational;
    the dedicated controller configured to directly determine a vibration frequency in the one or more of the rotor blades based on the measured blade oscillations and to generate an output signal to operate the auxiliary drive system to reduce the oscillations when the wind turbine is in the standstill conditions; and the dedicated controller further configured for being in communication with the wind turbine controller during operational conditions of the wind turbine subsequent to the commissioning phase and to receive control signals from the wind turbine controller.

13. The wind turbine according to claim 12, further comprising a dedicated power source that stores a predefined amount of energy to feed the dedicated controller and the auxiliary drive system during a predefined period of time.

14. The method according to claim 11, wherein the resonance condition is determined when the vibration frequencies exceed a resonance threshold value.

15. The method according to claim 11, wherein the resonance condition is determined when the vibration frequencies increase over a defined time period.

* * * * *